United States Patent [19]

Yajima et al.

[11] 4,267,210

[45] May 12, 1981

[54] METHOD FOR PRODUCING CORROSION-, HEAT- AND OXIDATION-RESISTANT MATERIALS

[75] Inventors: Seishi Yajima; Kiyohito Okamura; Toetsu Shishido; Yoshio Hasegawa, all of Oharai, Japan

[73] Assignee: The Foundation: The Research Institute for Special Inorganic Materials, Ibaragi, Japan

[21] Appl. No.: 60,563

[22] Filed: Jul. 25, 1979

[30] Foreign Application Priority Data

Jul. 28, 1978 [JP] Japan .................................. 53-91432
Dec. 22, 1978 [JP] Japan ................................ 53-157506
Dec. 23, 1978 [JP] Japan ................................ 53-158158

[51] Int. Cl.$^3$ ........................ B32B 17/10; B32B 15/08
[52] U.S. Cl. .................................... 427/226; 427/387; 427/404; 427/405; 427/419.2; 428/447; 428/427; 428/429
[58] Field of Search .................... 428/447, 427, 429; 427/387, 226; 528/13

[56] References Cited

U.S. PATENT DOCUMENTS 3,958,073 5/1976 Trevisan et al. ...................... 427/387

*Primary Examiner*—Ralph S. Kendall
*Attorney, Agent, or Firm*—Ladas & Parry

[57] ABSTRACT

A method for producing a corrosion-, heat- and oxidation-resistant material which comprises coating a substrate composed of at least one material selected from metals, carbonaceous substances and ceramics with a semi-inorganic compound, and heat-treating the coated substrate; said semi-inorganic compound being either (1) a modified organoborosiloxane compound obtained by reacting an organoborosiloxane compound with at least one organic compound selected from the group consisting of polyhydric aliphatic alcohols, aromatic alcohols, phenols and aromatic carboxylic acid at a temperature of from 250° to 450° in an atmosphere inert to the reaction, or (2) a modified organoborosiloxane compound obtained by adding at least one catalyst selected from the group consisting of Ni, Ti, Zr, Hf, V, Nb, Ta, Cr, Mo, W, Co, other transition metals, actinoid metals, lanthanoid metals, alloys of these metals, persulfate salts, organic peroxides, and halides of Al, Fe, B, Ga and In to an organoborosiloxane compound, and heating the mixture in a non-oxidizing atmosphere at a temperture of 300° to 550° C.

10 Claims, No Drawings

METHOD FOR PRODUCING CORROSION-, HEAT- AND OXIDATION-RESISTANT MATERIALS

BACKGROUND OF THE INVENTION

This invention relates to a method for producing a corrosion-, heat-, and oxidation-resistant material by subjecting a material composed of at least one of metals, carbonaceous substances and ceramics to a specified treatment.

Previously, the present inventors developed a method for producing a corrosion- and oxidation-resistant material by attaching an organoborosiloxane compound to such a material as metals, carbonaceous substances or ceramics, and heat-treating the product, and disclosed it in the specifications of Japanese Patent Applications Nos. 82958/75 (Laid-Open Publication No. 6714/77), 149469/75 (Laid-Open Publication No. 73108/77), 16095/77, 79664/77, and 8900/78.

On further extensive investigation, the present inventors discovered that a better heat- and oxidation-resistant material can be obtained by treating a material composed of at least one of metals, carbonaceous substances and ceramics with a modified organoborosiloxane compound obtained by subjecting an organoborosiloxane to a specified treatment. This discovery has led to the accomplishment of the present invention.

SUMMARY OF THE INVENTION

According to this invention, there is provided a method for producing a corrosion-, heat- and oxidation-resistant material which comprises coating a substrate composed of at least one material selected from metals, carbonaceous substances and ceramics with a semi-inorganic compound, and heat-treating the coated substrate; said semi-inorganic compound being either (1) a modified organoborosiloxane compound obtained by reacting an organoborosiloxane compound with at least one organic compound selected from the group consisting of polyhydric aliphatic alcohols, aromatic alcohols, phenols and aromatic carboxylic acids at a temperature of from 250° to 450° C. in an atmosphere inert to the reaction, or (2) a modified organoborosiloxane compound obtained by adding at least one catalyst selected from the group consisting of Ni, Ti, Zr, Hf, V, Nb, Ta, Cr, Mo, W, Co, other transition metals, actinoid metals, lanthanoid metals, alloys of these metals, persulfate salts, organic peroxides, and halides of Al, Fe, B, Ga and In to an organoborosiloxane compound, and heating the mixture in a non-oxidizing atmosphere at a temperature of from 300° to 550° C.

DETAILED DESCRIPTION OF THE INVENTION

The semi-inorganic compound (i.e., organic-inorganic compound) used as a treating agent for various substrates in the method of this invention should be either the modified organoborosiloxane compound specified in (1), or the modified organoborosiloxane compound specified in (2).

The modified organoborosiloxane compounds (1) and (2) were discovered for the first time by the present inventors, and are disclosed in detail in the specifications of Japanese Patent Applications Nos. 54036/78 and 54037/78.

The characteristic feature of the method of this invention is that in a method for producing a corrosion-, heat- and oxidation-resistant article which comprises coating a substrate composed of at least one material of metals, carbonaceous substances and ceramics with a treating agent and heat-treating the coated substrate, the modified organoborosiloxane compounds (1) and (2) are used as the treating agent. The modified organoborosiloxane compounds have better corrosion resistance, heat resistance and oxidation resistance than conventionally known organoborosiloxane compounds, and improved solubility in solvents. Accordingly, a high concentration solution can be easily obtained by dissolving the modified organoborosiloxane compound (1) or (2) in a solvent. In spite of its high concentration, this solution has sufficient flowability, and therefore, an operation of coating the solution on the surface of a substrate can be performed easily and efficiently. Since the adhesion of the treating solution to the substrate is good, the coating obtained after heat-treatment adheres firmly to the substrate, and has the advantage that it is less susceptible to cracking or delamination than those coatings which are obtained by conventional methods.

The modified organoborosiloxane compound (1) to be used to coat at least the outside surface of a substrate by the method of this invention can be produced by the method disclosed in the specification of Japanese Patent Publication No. 54036/78. Specifically, it can be produced by reacting a known organoborosiloxane compound in which a boron atom and a silicon atom are bonded to each other through an oxygen atom and an organic group is bonded to the silicon atom as a side-chain, with at least one organic compound selected from the group consisting of polyhydric aliphatic alcohols (e.g., ethylene glycol), aromatic alcohols (e.g., benzyl alcohol), phenols (e.g., phenol or hydroquinone) and aromatic carboxylic acids (e.g., terephthalic acid) in an atmosphere inert to the reaction at a temperature of 250° to 450° C. in the optional presence of a catalyst. Preferably, 0.1 to 8 moles of the organic compound is used per mole of the organoborosiloxane compound.

The side-chain organic group bonded to the silicon atom of the organoborosiloxane compound used as the starting material may, for example, be a hydrocarbon group, for example an alkyl group such as methyl or ethyl, a cycloalkyl group such as cyclohexyl, or an aryl group such as phenyl. Preferably, at least a part of the side-chain organic group is a phenyl group. Especially preferred as the starting material is an organoborosiloxane compound composed of (1) at least one siloxane unit selected from the group consisting of

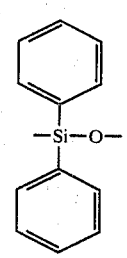

(A),

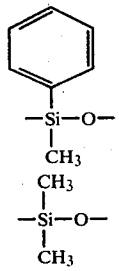

(B), and

(C)

the amount of the siloxane unit (C) being 0 to 30 mole% based on the entire siloxane units, and (2) a boroxane unit of the formula $$\begin{array}{c} -\text{B}-\text{O}- \\ | \\ \text{O} \\ | \end{array}$$ (D).

The modified organoborosiloxane compound (2) used to coat the surface of a substrate by the method of this invention can be produced by the method disclosed in the specification of Japanese Patent Publication No. 54037/78. Specifically, it can be produced by adding at least one catalyst selected from the group consisting of Ni, Ti, Zr, Hf, V, Nb, Ta, Cr, Mo, W, Co, other transition metals, actinoid metals, lanthanoid metals, alloys of these metals, persulfate salts, organic peroxides, and halides of Al, Fe, B, Ga, or In to the same organoborosiloxane compound as the starting material used to produce the compound (1), and heating the mixture to 300° to 350° C. in a non-oxidizing atmosphere.

The modified organoborosiloxane compound (1) or (2) is converted to ceramics when heated at a high temperature in a non-oxidizing atmosphere. The percent residue of such a compound upon firing is as high as 40 to 85%.

According to the method of this invention, a substrate composed of at least one material selected from metals, carbonaceous substance and ceramics is coated with the modified organoborosiloxane compound (1) or (2), and the coated substrate is then heat-treated. As a result of the heat treatment, the coated layer composed of the borosiloxane compound is converted to a ceramic coated layer which adheres firmly to the substrate and has good resistances to corrosion, heat and to oxidation. The ceramic coating so formed functions as a protective coating which imparts desirable properties to the substrate. Since the ceramic coated layer adheres firmly to the substrate, it also has the function of a bonding agent for the substrate. Similar effects of imparting superior corrosion, heat and oxidation resistances to the substrate and of bonding the substrate can be obtained when the substrate is coated with a mixture of the modified organoborosiloxane compound specified in this invention and a certain other component, and the coated substrate is then heat-treated. The other component may be a metal powder, a ceramic powder or an organosiloxane compound. If the firing conditions are suitably selected at this time, superior electric insulation can be imparted to the substrate in addition to resistances to corrosion, heat and oxidation.

The substrate to be treated may be in the form of a powder or a shaped article. The shaped article may have any desired configuration such as a plate, rod, fiber, tube, coil or complex profile.

The substrate is composed of at least one of metals, carbonaceous substances and ceramics. The metals include alkaline earth metals, transition metals, typical metals, methalloids, rare earth metals, actinium metals, and alloys of these metals. Typical examples of the metals are mild steel, special alloy steels, stainless steel, chromium, manganese, zinc, cobalt, nickel, copper, silver, aluminum, titanium, zirconium, molybdenum, tungsten, beryllium, yttrium, niobium, tantalum, Ti-Al alloy, Cu-Al alloy, Cu-Ni alloy, superhard alloys, and cermets. Typical examples of the carbonaceous substances are carbon and graphite. The ceramics include oxides, carbides, silicides, nitrides, borides, boron, and glass. Typical examples of the ceramics are $SiO_2$, $Al_2O_3$, BeO, $ZrO_2$, BN, $Si_3N_4$, $B_4C$, SiC, B/W, SiC/W, silicate glass, aluminosilicate glass, borate glass, borosilicate glass and phosphosilicate glass.

The modified organoborosiloxane compound (1) or (2) specified in this invention is generally obtained as a powder or viscous liquid. To make the powder or viscous liquid coatable on a substrate, it is preferred to dissolve or dilute it in or with a solvent therefor, such as tetrahydrofuran, benzene, toluene, xylene, hexane, diethyl ether, dioxane, chloroform, methylene chloride, petroleum ether, petroleum benzine, ligroin, furon, dimethyl sulfoxide, and dimethyl formamide, and use it as a coating solution. If the viscous liquid as obtained is coatable, it can be directly used. Alternatively, a melt obtained by heating the borosiloxane compound may be used for coating.

Various customary methods can be used to coat the substrate. For example, the following methods can be used.

(1) The surface of the substrate is coated with the coating solution, viscous liquid or melt by such an operation as brush coating or spraying. If desired, the coating liquid may be sprayed onto the surface of the heated substrate to perform coating and heat-treatment simultaneously.

(2) The substrate is dipped in the coating solution, viscous liquid or melt, and then withdrawn. This dipping method is especially preferred when the substrate is porous and it is desired to impregnate the coating liquid sufficiently into the inside of the substrate. If desired, to achieve sufficient impregnation, the substrate may be deaerated in vacuum prior to dipping.

The temperature at which the coated substrate is heat-treated varies depending upon the material of the substrate. Generally, temperatures in the range of 300° to 2,000° C. can be used. Usually, it is preferable to perform the heating in a non-oxidizing atmosphere (e.g., an inert gas such as argon or nitrogen, hydrogen gas, CO gas, $CO_2$ gas, or vacuum). However, when the substrate is a difficultly oxidizable metal, the heat treatment may be performed in an oxidizing atmosphere such as air, if the heating temperature is up to 1000° C. When a metal is used as the substrate and it is desired to obtain an electrically insulating coating by the heat-treatment of the coated layer, the heat-treatment is preferably carried out in an oxidizing atmosphere.

The method of this invention is directed to the production of a corrosion-, heat- and oxidation-resistant material by heat-treating a substrate coated with the modified organoborosiloxane compound, and can be practiced in various modes.

A first preferred embodiment of this invention is a method for producing a corrosion-, heat- and oxidation-resistant shaped article which comprises coating the modified organoborosiloxane compound specified in this invention on the surface of a shaped article composed of at least one of metals, carbonaceous substances and ceramics, and heat-treating the coated shaped article.

Preferably, the heat-treatment is carried out usually in a non-oxidizing atmosphere at a temperature of from 300° C. to 2,000° C. If desired, the coating step and the heat-treatment step may be performed two or more times.

When in the first embodiment, the substrate is a non-porous article, for example a plate or rod-like material of a metal or alloy, carbon fibers or a ceramic crucible such as an alumina crucible, the coating and heat-treatment gives a corrosion-, heat- and oxidation-resistant protective coating firmly adhering to the outer exposed surface of the shaped article. When the substrate is a shaped article composed of a metal or alloy, it is preferred to sand-blast the surface of the metal or alloy surface or chemically treat it (for example, treatment with a phosphoric acid or sodium hydroxide) because it improves the adhesion of the coating. Sometimes, the adhesion of the coating can be improved by using a coating solution of the modified organoborosiloxane containing a small amount of phosphoric acid, sodium hydroxide or potassium hydroxide.

On the other hand, when the substrate is a porous shaped article such as a graphite crucible for melting high-melting metals, or a susceptor made of porous ceramics, the coating and heat-treatment can afford a corrosion-, heat- and oxidation-resistant protective coating which adheres firmly not only to the outside surface but also to the inside surface of the shaped article.

The first embodiment of this invention is applicable to shaped articles usually sold on the market, such as crucibles, bricks and hollow cylindrical articles made of $Al_2O_3$, MgO, SiC, Fe, Al or Fe-13Cr alloy. It is also applicable to a shaped article obtained by sintering a commercially available inorganic molding powder (e.g., $Al_2O_3$, MgO, SiC, Fe, Al, or Fe-13Cr alloy) using the modified organoborosiloxane compound specified in this invention or known binders as a bonding agent, and to a shaped article obtained by heating the modified organoborosiloxane compound specified in this invention at 300° to 2,000° C. in a non-oxidizing atmosphere, and sintering the resulting ceramic powder alone or together with a known binder.

A second preferred embodiment of this invention is a method for producing a corrosion-, heat-, and oxidation-resistant shaped article, which comprises coating the modified organoborosiloxane compound specified in this invention on the surface of a powder composed of at least one of metals, carbonaceous substances and ceramics, shaping the coated powder by a suitable known method such as a die press method, a rubber press method, an extrusion method or sheet-forming method into an article of the desired configuration, and heat-treating the shaped article. In this embodiment, the coating of the modified organoborosiloxane applied to the surface of the powder serves as a bonding agent at the time of obtaining a shaped article from the powder. As a result, the particles are bonded firmly to one another to provide an integrated shaped article having good corrosion resistance, heat resistance, oxidation resistance and mechanical strength. The coated layer formed on the outside exposed surface of the shaped article serves to impart corrosion-, heat- and oxidation-resistances to the shaped article.

In the second embodiment of this invention, the coating of the surface of the powder can be performed, for example, by a method comprising sufficiently mixing a viscous solution of the modified organoborosiloxane compound and the powder; a method comprising sufficiently kneading the powder of the modified organoborosiloxane compound and the powder in the presence of a solvent of the types exemplified hereinabove; or by a method comprising dipping the powder in a solution containing the modified organoborosiloxane compound, and then withdrawing it from the solution.

The heat-treatment is preferably carried out by heating the coated article at a temperature of 300° to 2000° C. usually in a non-oxidizing atmosphere. The heat-treatment may be carried out after, or simultaneously with, the shaping of the powder.

The second embodiment of this invention in which a corrosion-, heat- and oxidation-resistant material is produced by surface coating, molding and heat-treatment of a powdery substrate is generally applicable with good results to ceramics powders. It can also be applied to granular carbonaceous substances or granular metals. For example, a metal-melting crucible having superior performance can be obtained by coating granular carbon, molding it into the crucible, and heat-treating it. Or by the coating, molding and heat-treatment of a powder of an alloy such as an Fe-Cr alloy or Ni-Cr alloy, a shaped article having superior performance can be obtained.

A third preferred embodiment of this invention is a method for producing a reinforced composite material, which comprises uniting at least one matrix selected from the group consisting of metals, carbonaceous substances, ceramics and plastics with an inorganic reinforcing material, said inorganic reinforcing material being an article coated with a ceramic layer, said article being obtained by coating the surface of a substrate composed of at least one of metals, carbonaceous substances and ceramics with the modified organoborosiloxane compound specified in this invention, and heat-treating the coated substrate.

A reinforced composite material composed of a matrix such as metals, ceramics or plastics, and an inorganic reinforcing material is known per se. For example, by using carbon fibers as the inorganic reinforcing material, composites of carbon fiber-aluminum, carbon fiber-magnesium oxide, and carbon fiber-epoxy resin can be obtained. It is known however that in the case of the composite of carbon fibers and aluminum, the carbon fibers react excessively with the aluminum matrix to form aluminum carbide in the boundary between them which will cause a decrease in mechanical strength at high temperatures. In the case of the composite of carbon fibers and magnesium oxide, the surface of the carbon fibers react excessively with magnesium oxide. Moreover, since there is a large difference in the coefficient of thermal expansion between the carbon fibers and magnesium oxide, cracks may form in the matrix. In the composite of carbon fibers and epoxy resin, wetting between them is not complete.

Thus, when the matrix is reactive, it reacts excessively with the inorganic reinforcing agent. Or when the matrix is a plastic material, its wetting poses a problem. The resulting composites, therefore, are not entirely satisfactory.

Since the inorganic reinforcing material used in the third embodiment of this invention is coated at its surface with a corrosion-, heat- and oxidation-resistant ceramic layer, its stability to reaction with the matrix is enhanced, and its wetting with the matrix is improved. As a result, the reinforced composite material obtained by using the aforesaid inorganic reinforcing material has the advantage that it has higher strengths (tensile, flexural, impact) at room temperature than conventional composites, and its strengths are not decreased at high temperatures as in conventional products.

The substrate to be treated in the third embodiment is preferably in the form of fibers such as continous filaments or staples, or whiskers. If desired, it may be in the form of flakes, chops and granules. The material of the substrate may be a metal, carbonaceous material or ceramics. Preferably the heat-treatment is carried out by heating at 300° to 2,000° C. in a non-oxidizing atmosphere.

At least one of metals, carbonaceous substances, ceramics and plastics is used as the matrix to be combined with the inorganic reinforcing material having a ceramic coated layer. Examples of the metals as the matrix are metals having a melting point of at least 500° C., and alloys thereof. Examples of the ceramics are oxides, carbides, silicides, nitrides, borides, boron, cement, gypsum, mica, asbestos, and general ceramics. Examples of the plastics are polyester resins, epoxy resins, phenolic resins, polyacrylonitrile, polystyrene, polyimides, polyvinyl chloride, and general plastics. The matrix, however, is not limited to these materials, and for example, cermets, rubbers, and wood can of course be used.

The initial shape of the matrix is suitably a powder, foil or plate. In the case of plastics, the initial form may be a solution.

Any conventional methods for combining the matrix with the inorganic reinforcing agent can be used in this invention.

The suitable ratio between the inorganic reinforcing material and the matrix is such that the proportion of the inorganic reinforcing material is 5 to 90%, preferably 10 to 60%, by volume based on the sum of the inorganic reinforcing material and the matrix.

A fourth preferred embodiment of this invention is a method which comprises preparing a coating composition from the modified organoborosiloxane compound specified in this invention and at least one of powdery metals, carbonaceous substances and ceramics, coating a substrate composed of at least one of metals, carbonaceous substances and ceramics with the resulting coating composition, and then heat-treating the coated substrate.

The aforesaid coating composition is suitable for use in forming a protective coating having good corrosion, heat and oxidation resistances on the surface of the substrate composed of at least one of metals, carbonaceous substances and ceramics, or in bonding two similar or dissimilar substrates selected from metals, carbonaceous substances and ceramics.

The coating composition used in the fourth embodiment of this invention contains the modified organoborosiloxane compound (1) or (2) specified in this invention (a first component), and at least one of powdery metals, carbonaceous substances and ceramics (a second component). The preferred particle diameter of the second component (powder) is usually 0.1 to 10 microns. The ratio between the first component and the second component in the composition is such that the proportion of the first component is usually 10 to 95% by weight based on the total weight of the first and second components.

When the modified organoborosiloxane used as the first component is obtained as a liquid, the coating composition can be prepared by mixing the first and second components. Usually, however, the coating composition preferably contains a solvent. Usable solvents are thuose exemplified hereinabove. If desired, the coating composition mah further contain various additives such as vehicles, plasticizers, desiccants, pigments, pigment dispersants, curing agents, ultraviolet absorbers, antioxidants, antisagging agents, levelling agents, antifoamers, and crosslinking agents for borosiloxane compounds.

The substrate used in the fourth embodiment of this invention is composed of at least one of metals, carbonaceous substances and ceramics. The metals used as the substrate are preferably metals or alloys having a melting point of at least 500° C. The ceramics as the substrate are preferably oxides, carbides, silicides, nitrides, borides, boron, cement, gypsum, mica, and asbestos. When the aforesaid coating composition is used to bond substrates, combinations of metal-metal, metal-ceramics, ceramics-ceramics, ceramics-carbon, carbon-metal, and carbon-carbon may be used as materials to be bonded. When using ceramics or carbon materials, the coating composition in accordance with this invention is especially effective for building irregularly-shaped bricks.

The method for forming a protective coating on the substrate by using the aforesaid coating composition can be performed in the same way as described above with regard to the first embodiment. The method for bonding substrates to each other is basically the same as the method of forming a protective coating. Specifically, the surfaces to be coated of the substrates are coated with the coating composition of this invention, and then the assembly is heated. When the heating is carried out under pressure, a stronger bonding can be achieved. Application of pressure may be effected by simply placing a weight on the subtrates to be bonded. It is recommended in this case to heat only that part of the assembly which is required to be heated. Use of hot press is also effective because it results in simultaneous heating and pressing.

If desired, the formation of a protective coating and bonding may be effected simultaneously. In other words, it is possible to bond two substrates to each other and to form a protective coating on the surface of the bonded article. Both in the formation of a protective coating and in bonding, it is preferable to carry out the heat-treatment usually in a non-oxidizing atmosphere at a temperature of 300° to 2,000° C.

The substrate having a protective coating in the fourth embodiment of this invention is characterized by the fact that it is generally stable in use at 400° C. and higher in the air. A heat-resistant insulation coating can be obtained when a ceramic powder such as $Al_2O_3$ or $SiO_2$ is used as a second component, and the baking temperature is limited to the one at which the borosiloxane compound is not completely converted to an inorganic compound (usually 500° C.). On the other hand, when a powder of a metal such as aluminum and brass is used as the second component and the baking is performed at a temperature up to a point at which the borosiloxane compound is completely converted to an inorganic compound, a heat-resistant, electrically conductive coating is obtained. When a protective coating is formed by using a coating composition composed mainly of a combination of a ceramic powder and the borosiloxane compound, the coating obtained after heat-treatment is chemically stable, and shows high corrosion resistance against acids, alkalies, $SO_2$ and other corrosive gases, exhaust waste gases, reducing gases, molten metals, and molten slags. The protective coating adheres strongly to the substrate, and no delamination is noted under ordinary rapid cooling conditions.

The bonded article obtained by bonding two substrates to each other is generally stable in use at more than 400° C. in the air. The bond strength is usually at least 700 kg/cm², and does not decrease even at 500° C. The electric conductivity and chemical stability of the bonded interface are the same as in the case of the protective coating, and the bonded interface is stable under quenching conditions.

A coating having good electric insulation at high temperatures can be formed on the surface of a substrate metal by performing the method of forming a protective coating in accordance with the fourth embodiment in a special way. Specifically, this special method comprises preparing two coating compositions having different constituents, coating a first coating composition on the surface of a metal, heat-treating the coated metal at a relatively low temperature in an oxidizing atmosphere such as air to form a first protective coating, then coating a second coating composition on the first protective coating, and heat-treating the coated product a relatively high temperature in an oxidizing atmosphere to form a second protective coating.

More specifically, this method comprises a first step of forming a first protective coating by coating the surface of a substrate metal with a first coating composition composed of 0.5 to 98% by weight of an aluminum powder, 0.5 to 80% of this modified organoborosiloxane compound specified in this invention, 0 to 50% by weight of an additive and 0.5 to 50% of a solvent, and heat-treating the coated substrate at a relatively low temperature of 500° to 1,000° C. in an oxidizing atmosphere, and a second step of forming a second protective coating by coating a second coating composition composed of 0 to 98% by weight of an aluminum powder, 0.5 to 80% by weight of the modified organoborosiloxane compound, 0.5 to 98% by weight of a molybdenum or tungsten powder, 0 to 50% by weight of manganese, 0 to 50% by weight of a glass powder, 0 to 50% by weight of an additive and 0.5 to 50% by weight of a solvent on the first protective coating, and heat-treating the coated product in an oxidizing atmosphere at a relatively high temperature of 600° to 1,200° C.

According to this method, a wide range of metallic materials including heat-resistant metals, electrically conductive metals, structural metal, superhard alloys and cermets can be used as the substrate metal. As a result, a coating having high heat resistance and insulation is formed on the substrate metal with a high bond strength.

A fifth preferred embodiment of this invention is a method of forming an electrically unsulating coating of superior performance on the surface of a substrate metal by using a somewhat different type of coating composition than the coating compositions used in the fourth embodiment. This method comprises coating the surface of a substrate metal with a coating composition comprising a uniform mixture of the modified organoborosiloxane compound specified in this invention and an organosiloxane compound, and heat-treating the coated substrate in an oxidizings atmosphere such as air.

The organosiloxane compound (second component) used in admixture with the modified organoborosiloxane compound (first component) in this coating composition is at least one of silicone oils, silicone waxes, silicone greases, and silicone rubbers which have a straight-chain structure, a three-dimensional cross-linked structure or a combination of these and in which the main chain is composed mainly of siloxane bonds with an alkyl or aryl group or a group derived therefrom being bonded to the silicon atom as a side-chain group. Preferably, the side-chain group of the organosiloxane compound is a methyl or phenyl group, especially the phenyl group. The silicone oils, silicone waxes and silicone greases are used as such or as dissolved in organic solvents, and the silicone rubbers are used as a solution in an organic solvent.

The coating composition preferably contains a solvent. The ratio between the first and second components in the coating composition is preferably such that the proportion of the first component is 1 to 70% by weight based on the total weight of the first and second components.

The substrate metal used in the fifth embodiment of this invention is either (i) a metal itself, (ii) a metal having a protective coating applied to its surface by a known method using flame spray, plating, sputtering, cladding, coating of enamel, etc.; or (iii) a metal having an oxide coating formed on at least a part of its surface by heating in an oxidizing atmosphere. When the substrate is the metal (i), the coating composition is applied directly on the surface of the metal. In the case of the metals (ii) or (iii), the coating composition is applied to the protective coating or the oxide coating present on the surface of the substrate.

The chief constituent metals of the substrate metal are, for example, copper, silver, aluminum, iron, cobalt, nickel, zinc, beryllium, titanium, vanadium, chromium, manganese, yttrium, rare earth metals, zirconium, niobium, molybdenum, and alloys based on these metals.

If desired, the coating composition used in the fifth embodiment of this invention may contain one or more of the following ingredients (a) to (d).

(a) Fine powders of heat-resistant pigments.
(b) Fine powders of metals which are easily oxidized by heating in the air, and thus converted to non-conductors.
(c) Fine powders of metal carbides.
(d) Additives.

The heat-resistant pigment (a) is for example, at least one member of the group consisting of mica, asbestos, silica, zinc oxide, alumina, titania, calcium carbonate, silicate glass, aluminosilicate glass, borate glass, borosilicate, phosphosilicate glass, ordinary oxide glasses, and ordinary ceramics. It may be included in an amount of 0 to 80% by weight based on the total weight of the first and second components.

The metal (b) which is easily oxidized by heating in the air and converted to a non-conductor is, for example, at least one member of the group consisting of Mo, W, Ti, Mn and Al. It may be included in an amount of 0 to 90% by weight based on the total weight of the first and second components.

The metal carbide (c) is, for example, at least one member of the group consisting of B₄C, TiC and ZrC, and can be included in an amount of 0 to 80% by weight based on the total weight of the first and second components.

The additive (d) is, for example, at least one member of the group consisting of vehicles, plasticizers, desiccants, pigment dispersants, hardening agents, ultraviolet absorbers, antioxidants, antisagging agents, levelling agents, antifoamers, metal soaps, and crosslinking agents for each of the first and second components or forming a crosslinkage between the two. The additive (d) may be included in an amount of 0 to 30% by weight based on the total weight of the first and second components.

Preferably, the heat-treatment temperature is from 150° C. to a temperature just below the melting point of the substrate metal. This heat-treatment results in the formation on the substrate metal of a protective coating which firmly adheres to the substrate metal and has very good electric insulation at high temperatures.

The corrosion-, heat- and oxidation-resistant materials can be used in a wide range of applications. For example, they are useful as architectural and building materials, materials for transportation facilities such as air planes, ships and boats, and motor vehicles, anticorrosive materials for industrial plants, electrical materials, mechanical materials, nuclear power materials, and sporting goods, etc. The metals having an electrically insulating surface coating obtained in the fourth and fifth embodiments of this invention are especially suitable for use in windings in motors and electromagnets which require insulation at high temperatures.

The following Examples illustrate the present invention more specifically.

EXAMPLE 1

A 5-liter three-necked flask was charged with 310 g of boric acid, 1,898 g of diphenyldichlorosilane and 3 liters of anhydrous di-n-butyl ether. The mixture was stirred at 100° C. for 18 hours, and cooled to form a white precipitate. After removing the di-n-butyl ether, the precipitate was washed with methanol to remove the unreacted boric acid. The residue was washed with water to give 1,680 g of a borodiphenylsiloxane compound. The borodiphenylsiloxane compound (200 g) was intimately mixed with 20 g of hydroquinone. The mixture was heated with stirring in a 500 ml. flask in a nitrogen atmosphere at a rate of 50° C. per hour, and reacted at 300° C. for 1 hour to afford a modified organoborosiloxane compound.

A solution of 30 g of the modified organoborosiloxane compound in 100 ml. of tetrahydrofuran was brush-coated on a 3 mm-thick steel plate. The coated steel plate was then heat-treated to 1,000° C. at a temperature raising rate of 200° C. per hour in an argon stream flowing at a rate of 50 ml/min.

To examine the oxidation resistance of the treated product, the treated steel plate and a non-treated steel plate were each heated at 1000° C. to 50 hours in the air, and the amount of increase owing to oxiation was measured. It was 3 mg/cm² for the treated steel, and 60 mg/cm² for the non-treated steel plate.

EXAMPLE 2

Diphenyldichlorosilane (135 g) and 20 g of boric acid were dissolved in 400 ml of anhydrous di-n-butyl ether, and refluxed for 20 hours in an atmosphere of nitrogen gas. The resulting product was directly condensed to obtain an organoborosiloxane compound as a white powder. The resulting powder was intimately mixed with 5% by weight of SmCo₅ powder (320 mesh under). The mixture was then heated at 400° C. for 20 hours in a stream of nitrogen, and cooled. The resulting compound was dissolved in tetrahydrofuran, and the SmCo₅ powder was separated by filtration. The residue was concentrated to dryness by an evaporator to afford a modified organoborosiloxane compound.

The modified organoborosiloxane compound was dissolved in tetrahydrofuran to saturation. The solution was brush-coated on the surface of an 3-mm-thick aluminum plate, and then heat-treated in the air at 600° C. after raising the temperature at a rate of 300° C. per hour.

The surface-coated aluminum plate thus obtained was maintained in the air at 300° C. for 100 hours. No change in weight was observed, and it was ascertained that the aluminum matrix was protected by the surface coating.

EXAMPLE 3

Carbon fibers having a diameter of about 5 μm were dipped in the same tetrahydrofuran solution of the modified organoborosiloxane compound used in Example 1, and withdrawn. The carbon fibers were then heated to 1,300° C. at a rate of 200° C. per hour in a stream of argon flowing at a rate of 50 ml/min. The treated carbon fibers had improved oxidation resistance, and improved wetting with respect to molten metals (especially Al, Ti).

EXAMPLE 4

Two hundred grams of a borodiphenylsiloxane compound prepared by the method described in Example 1 was intimately mixed with 20 g of phenol. The mixture was heated with stirring in a 500 ml flask at a rate of 55° C. per hour in an atmosphere of nitrogen, and then reacted at 450° C. for 1 hour to afford a modified organoborosiloxane compound.

A solution of 30 g of this modified organoborosiloxane in 100 ml of tetrahydrofuran was impregnated in graphite bricks (100×200×400 mm) in a vacuum of 30 mmHg, and heated to 800° C. at a rate of 400° C. per hour in a stream of argon flowing at a rate of 50 ml/min. The heat-treated bricks were again impregnated with the above solution, and heated to 1900° C. at the same rate as above in the same argon stream as above.

When the resulting graphite bricks were heated at 800° C. in the air for 1 hour, the weight loss owing to oxidation was 1.4% by weight. Under the same conditions, untreated graphite bricks showed a weight loss owing to oxidation of 15% by weight. The treated graphite bricks were also found to have improved gas impermeability.

EXAMPLE 5

Two hundred grams of the same borodiphenylsiloxane as used in Example 4 was intimately mixed with 20 g of hydroquinone and 1 g of ammonium persulfate. The mixture was heated at a rate of 50° C. per hour in a 500 ml flask with stirring in an atmosphere of nitrogen, and reacted at 300° C. for 1 hour to afford a modified organoborosiloxane compound.

A solution of the modified organoborosiloxane compound in tetrahydrofuran was coated on a mild steel plate (carbon content less than 0.03%) having a parkerized surface, and heated to 600° C. in the air to form a coated steel plate. The weight increase due to oxidation in air at 500° C. of the treated mild steel was only-twelfth of that of non-treated mild steel plate.

EXAMPLE 6

Diphenyldichlorosilane (135 g) and 20 g of boric acid were dissolved in 400 ml of anhydrous di-n-butyl ether. The solution was refluxed for 20 hours in an atmosphere of nitrogen gas and directly condensed to afford an organoborosiloxane compound as a white powder. This powder was intimately mixed with 2% by weight of ammonium persulfate. The mixture was sealed in vacuum into a quartz tube, and heated at 420° C. for 20 hours to afford a modified organoborosiloxane compound.

To 10 parts by weight of the resulting modified organoborosiloxane compound was added 90 parts by weight of α-SiC having a particle diameter smaller than 150 mesh, and tetrahydrofuran was further added. They were mixed with each other, and then the tetrahydrofuran was evaporated off to afford α-SiC particles coated with the organoborosiloxane compound.

The SiC particles were cold-molded at 2000 kg/cm$^2$, and heated to 1700° C. at a rate of 200° C. per hour in a stream of nitrogen flowing at a rate of 50 ml to afford an SiC shaped article. The SiC shaped article had a bulk density of 2.692 g/cm$^3$ and a flexural strength of 5.27 kg/mm$^2$. The shaped article had especially strong resistance to corrosive attack of molten iron or molten phosphor bronze.

EXAMPLE 7

Five parts by weight of the modified organoborosiloxane compound used in Example 5 and 1 part by weight of borosilicate glass were mixed in powder form, and hot pressed in a carbon die by heating it to 1000° C. with high-frequency induction under a pressure of 100 kg/cm$^2$.

When the resulting shaped article was heated in the air at 500° C. for 10 hours, no change in weight was noted, and the article showed superior oxidation resistance. It is suitable for use in a heater or resistor to be used at below 1,300° C.

EXAMPLE 8

A bundle of carbon fibers (2000 fibers) was dipped in a 10% by weight tetrahydrofuran solution of the same modified organoborosiloxane compound as used in Example 5, and then withdrawn. The treated fiber bundle was heated to 600° C. in nitrogen gas. The coated fiber bundle was laminated in an amount of 40% by volume (based on the entire assembly) on a pure aluminum foil. The laminate was placed in a steel die, and hot-pressed at 650° C. and 100 kg/cm$^2$ in an argon stream.

The flexural strength of the carbon fiber-aluminum composite obtained was as shown in Table 1. Table 1 also shows the flexural strength of a composite obtained by laminating a non-treated bundle of fibers to in an amount of 40% by volume (based on the entire composite) to a pure aluminum foil, and hot-pressing the laminate at 650° C. and 100 kg/cm$^2$.

TABLE 1

| | Flexural strength (kg/mm$^2$) | |
|---|---|---|
| | at room temperature | at 400° C. |
| Composite material of the invention | 103 | 105 |
| Composite material made by using non-treated carbon fibers | 70 | 30 |

It is seen from Table 1 that the flexural strength of the composite of this invention does not decrease even at 400° C., and the composite is suitable for use at high temperature.

EXAMPLE 9

A bundle of 1,200 continuous silicon carbide filaments (synthesized from polycarbosilane) was dipped in a 7% by weight tetrahydrofuran solution of the same modified organoborosiloxane compound as used in Example 8, and then withdrawn. The treated filament bundle was heated to 650° C. in nitrogen gas. The coated filament bundle was filled in a silica glass tube having one sealed end, and then molten aluminum (750° C.) was poured into the glass tube from its top. The inside of the tube was evacuated to remove bubbles. The tensile strength of the resulting silicon carbide fibers (43 vol. %)-aluminum composite is shown in Table 2. The tensile strength of a composite made from a non-treated bundle of silicon carbide filaments by the same aluminum dipping as above is also shown in Table 2.

TABLE 2

| | Tensile strength (kg/mm$^2$) | |
|---|---|---|
| | at room temperature | at 400° C. |
| Composite of this invention | 110 | 108 |
| Composite made by using a non-treated silicon carbide fibers | 90 | 70 |

EXAMPLE 10

The same coated carbon fibers as obtained in Example 8 were combined in an amount of 45% by volume with an epoxy resin, and the epoxy resin was hardened by using a curing agent. The flexural strength of the resulting composite was about 1.5 times that of a composite prepared by using non-treated carbon fibers.

EXAMPLE 11

To 7 parts by weight of silica gel having a particle diameter of 0.5 micron was added 1 part by weight of the same modified organoborosiloxane compound as used in Example 5. Further, 1 part of by weight of a silicone resin modified with an alkyd resin and 1 part by weight of tetrahydrofuran as a solvent were added to form an emulsion-like coating composition. The coating composition was coated on a parkerized mild steel plate or copper plate, and heated to 500° C. in the air. A good heat-resistant, insulating coating was obtained. The insulating property of this coating can be maintained stable even when it is used at 500° C. in the air. Similar results were obtained when the above procedure was repeated except that the silica gel was wholly or partly replaced by γ-alumina, titanium oxide, zinc oxide, chromium oxide, and red iron oxide.

The coating composition used in this Example is also effective for stabilized coating and impregnation of carbonaceous materials.

EXAMPLE 12

One part by weight of the same modified organoborosiloxane as used in Example 11 was added to 7 parts by weight of metallic aluminum powder having a particle diameter of 2 microns. Furthermore, 1 part by weight of the same additive and 1 part by weight of the same solvent as in Example 11 were added to form an emulsion-like coating composition. When the coating composition was coated on a polished steel plate and an alkali-treated mild steel plate, and heated to 500° C. in the air, a good heat-resistant coating was obtained. The coating was stable in the air at a temperature of up to 800° C. at the highest, and was normally stable at 650° C.

Similar results were obtained by repeating the above procedure except that the aluminum powder was partly or wholly replaced by a brass powder or a copper powder.

EXAMPLE 13

Four parts by weight of the same modified organoborosiloxane compound as used in Example 11 was mixed with 4 parts by weight of $\alpha$-SiC powder having a particle diameter of 1 micron., and 1 part of tetrahydrofuran was added to form a paste-like adhesive. Two commercially available SiC plates (density 3.0 g/cm$^3$) were provided, and the paste was coated on the two surfaces to be bonded. The two plates were then superposed. The bonded portion was heated by an acetylene burner to bond the two plates. A bonded article was obtained with a tensile strength of 3.0 kg/mm$^2$. The bonded interface was found to have high thermal shock resistance as a result of a test comprising letting it fall into water from an atmosphere kept at 800° C.

This adhesive can be used bonding agent can be used to bond articles of complicated shapes such as irregularly-shaped bricks, or dissimilar adherends such as SiC-C, or MgO-C.

EXAMPLE 14

Two hundred grams of a borodiphenylsiloxane compound synthesized by the method described in Example 1 was intimately mixed with 27 g of ethylene glycol. In a 500 ml flask, the mixture was heated with stirring in an atmosphere of nitrogen at a rate of 120° C. per hour, and reacted at 350° C. for 1 hour to afford a dark brown compound. Two hundred grams of this compound was intimately mixed with 20 g of hydroquinone. In a 500 ml flask, the mixture was heated with stirring in an atmosphere of nitrogen at a rate of 50° C. per hour, and reacted at 300° C. for 1 hour to afford a modified organoborosiloxane compound.

A first coating composition was prepared by mixing 20% by weight of the resulting modified organoborosiloxane compound, 60% by weight of an aluminum powder, 5% by weight of an additive resulting from the modification of a silicone resin with an alkyd resin, and 15% by weight of a thinner. Separately, a second coating composition was prepared from 10% by weight of the modified organoborosiloxane compound, 60% by weight of an aluminum powder, 5% by weight of a molybdenum powder, 1% by weight of a manganese powder, 5% by weight of a fine powder of silica glass, 5% by weight of an additive resulting from the modification of a silicone resin with an alkyd resin, 4% by weight of tetrahydrofuran and 10% by weight of a thinner.

A copper wire plated with nickel and chromium to a thickness of about 40 microns was coated with the first coating composition, heated to 800° C. in the air, and allowed to cool. Then, the second coating composition was applied to the resulting coated layer, and heated to 1000° C. in the air. The resulting coating had superior oxidation resistance in heating in the air, and did not undergo dielectric breakdown at high temperatures.

Similar results were obtained when repeating the above procedure except that the copper wire was coated by metal flame spraying, or clad with metal, instead of plating.

EXAMPLE 15

A first coating composition was prepared by mixing 35% by weight of the same modified organoborosiloxane compound as used in Example 5, 40% by weight of an aluminum powder, 5% by weight of an additive resulting from the modification of a silicone resin with an alkyd resin, 5% by weight of tetrahydrofuran, 5% by weight of ethyl acetate and 10% by weight of a thinner. Separately, a second coating composition was prepared from 5% by weight of the modified organoborosiloxane, 60% by weight of an aluminum powder, 5% by weight of a molybdenum powder, 5% by weight of a powder of aluminosilicate glass, 5% by weight of an additive resulting from the modification of a silicone resin with an alkyd resin, 5% by weight of tetrahydrofuran, 5% by weight of ethyl acetate and 10% by weight of a thinner.

The first coating composition was coated on a sample of HK steel, heated in the air to 900° C. in the air, and allowed to cool. The second coating composition was then applied, and heated to 1050° C. in the air. The resulting coating well adhered to the HK steel sample, and did not undergo peeling by mechanical and thermal shocks. It showed no change even when heated at 1000° C. in the air for a long period of time.

EXAMPLE 16

The same first coating composition as used in Example 14 was coated on a titanium plate, and baked at 500° C. Then, the same second coating composition as used in Example was coated, and baked at 800° C. to form a heat-resistant insulating coating. The resulting coating well adhered to the titanium plate, and did not undergo peeling by mechanical and thermal shocks. It did not change even when heated at 1000° C. in the air for a long period of time.

EXAMPLE 17

Two hundred grams of a borodiphenylsiloxane compound synthesized by the method described in Example 1 was intimately mixed with 27 g of ethylene glycol. In a 500 ml flask, the mixture was heated with stirring in an atmosphere of nitrogen at a rate of 120 C. per hour, and reacted at 350° C. for 1 hour to afford a dark brown compound. Two hundred grams of this compound was intimately mixed with 20 g of hydroquinone. In a 500 ml flask, the mixture was heated with stirring in an atmosphere of nitrogen at a rate of 50° C. per hour, and reacted at 300° C. for 1 hour to afford a modified organoborosiloxane compound (I).

Three moles of diphenylsilane diol, 2 moles of dimethylsilane diol and 2 moles of phenylsilane triol were weighed, and xylene was added. The mixture was refluxed for 1 hour in an atmosphere of nitrogen gas. After the reaction, the insoluble matter was separated by filtration, and xylene was removed by an evaporator. The resulting intermediate product was heated at 250° C. for 1 hour in an atmosphere of nitrogen to afford an organosiloxane compound (II).

Thirty parts by weight of the modified organoborosiloxane compounds and (I) and 50 parts by weight of the organosiloxane compound (II) were mixed, and 20 parts by weight of a mixed solvent composed of n-butanol, n-hexane, and tetrahydrofuran was added to the resulting mixture to form a coating composition. The coating composition was coated on a copper wire, heated in the air at a rate of 10° C. per minute, and maintained at 400° C. for 10 minutes to form a coated copper wire.

When the coated wire was heated at 380° C. for 200 hours in the air, the coating was not peeled off, and its electric insulation was retained. When the coated copper wire was further heated to 900° C. in the air, the coating was converted to ceramics. However, the ceramic coating closely adhered to the substrate copper wire, and its electric insulation was retained.

The coated copper wire did not undergo delamination at the time of unwinding.

EXAMPLE 18

Thirty parts by weight of the same modified organoborosiloxane compound (I) as used in Example 17, 40 parts by weight of the same organosiloxane compound (II) as used in Example 17, 5 parts by weight of a fine powder of silica, 5 parts by weight of lithium soap, and 20 parts by weight of a mixed solvent composed of n-butanol, n-hexane and ethyl acetate were well mixed to form a coating composition.

The coating composition was coated on an aluminum plate, heated in the air at a rate of 20° C. per minute, and maintained at 300° C. for 30 minutes to form a coated aluminum plate. When the aluminum plate was heated in the air at 300° C. for 200 hours, and rapidly cooled, the coating was not peeled off, and its electric insulation was retained. Similar effects were obtained when the base metal was other than aluminum.

EXAMPLE 19

The coating composition used in Example 17 was used as a first coating composition. A second coating composition was prepared by well mixing 20 parts by weight of the same modified organoborosiloxane composition (I) as used in Example 17, 30 parts by weight of the same organosiloxane compound (II) as used in Example 17, 30 parts by weight of a fine powder of titania, and 20 parts by weight of a mixed solvent composed of n-propanol and iso-pentane.

The first coating composition was coated on a copper plate, heated in the air at a rate of 20° C. per minute, maintained at 300° C. for 5 minutes, and allowed to cool. Then, the second coating composition was applied, heated in the air at a rate of 20° C. per minute, and maintained at 900° C. for 5 minutes to afford a coated copper plate. The coating was converted to a ceramic, and well adhered closely to the substrate copper plate. Even when the coated copper plate was heated in the air at 600° C. for 200 hours, its insulating property was retained.

EXAMPLE 20

A copper plate was coated under the same conditions as in Example 19 except that a fine powder of molybdenum or boron carbide was used instead of the fine powder of titania in the second coating composition. There was obtained a coating which is exhibited insulating properties at high temperatures and had the same performance as in Example 19.

What we claim is:

1. A method for producing a corrosion-, heat and oxidation-resistant material which comprises coating a substrate composed of at least one material selected from metals, carbonaceous substances and ceramics with a semi-inorganic compound, and heat-treating the coated substrate at a temperature of 300° to 2000° C. said semi-inorganic compound being a modified organoborosiloxane compound obtained by reacting an organoborosiloxane compound composed of (1) at least one siloxane unit selected from the group consisting of

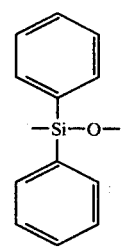

(A),

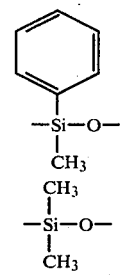

(B), and (C)

the content of the siloxane unit (C) being 0 to 30 mole% based on the total siloxane units, and (2) a boroxane unit of the formula

(D)

with at least one organic compound selected from the group consisting of polyhydric aliphatic alcohols, aromatic alcohols, phenols and aromatic carboxylic acids at a temperature of from 250° to 450° in an atmosphere inert to the reaction.

2. The method of claim 1 wherein said heat-treatment is carried out by heating the coated substrate at a temperature of 300° to 2,000° C. in a non-oxidizing atmosphere.

3. The method of claim 1 wherein said substrate is a nonporous shaped article composed of at least one material selected from metals, carbonaceous substances and ceramics.

4. The method of claim 1 wherein said substrate is a porous shaped article composed of at least one material selected from carbonaceous substances and ceramics.

5. The method of claim 1 wherein said substrate is a powder composed of at least one material selected from metals, carbonaceous substances and ceramics, said powder is coated with said semi-inorganic compound, the coated powder is shaped, and the shaped article is heat-treated.

6. The method of claim 1 which further includes a step of combining the heat-treated substrate with at least one matrix selected from the group consisting of metals, carbonaceous substances, ceramics and plastics to form a composite.

7. The method of claim 6 wherein the heat-treatment is carried out at a temperature of 300° to 2,000° C. in a non-oxidizing atmosphere.

8. The method of claim 1 wherein a coating composition is prepared which contains said semi-inorganic compound and at least one of powdery metals, carbonaceous substances and ceramics, and said substrate is coated with said coating composition.

9. The method of claim 8 which includes a first step of forming a first protective coating by coating the surface of a substrate metal with a first coating composition composed of 0.5 to 98% by weight of an aluminum powder, 0.5 to 80% of said semi-inorganic compound, 0 to 50% by weight of an additive and 0.5 to 50% by weight of a solvent, and heat-treating the coated substrate at a relatively low temperature of 500° to 1,000° C. in an oxidizing atmosphere, and a second step of forming a second protective coating by coating a second coating composition composed of 0 to 98% by weight of an aluminum powder, 0.5 to 80% by weight of said semi-inorganic compound, 0.5 to 98% by weight of a molybdenum or tungsten powder, 0 to 50% by weight of manganese powder, 0 to 50% by weight of a glass powder, 0 to 50% by weight of an additive and 0.5 to 50% by weight of a solvent on the first protective coating, and heat-treating the coated product in an oxidizing atmosphere at a relatively high temperature of 600° to 1,200° C.

10. The method of claim 1 wherein a coating composition is prepared which contains said semi-inorganic compound and an organosiloxane compound, and said substrate composed of metal is coated with the coating composition and heat-treated in an oxidizing atmosphere.

* * * * *